United States Patent [19]

Saitoh et al.

[11] Patent Number: 4,588,562

[45] Date of Patent: May 13, 1986

[54] APPARATUS FOR PURIFYING CRYSTALS

[75] Inventors: Shigeru Saitoh, Nakano; Masaaki Shimada; Takeshi Imura, both of Iwaki, all of Japan

[73] Assignee: Kureha Kagaku Kogyo Kabushiki Kaisha, Tokyo, Japan

[21] Appl. No.: 631,443

[22] Filed: Jul. 16, 1984

[30] Foreign Application Priority Data

Jul. 21, 1983 [JP] Japan .................. 58-133209

[51] Int. Cl.$^4$ .................................... B01D 9/00
[52] U.S. Cl. .................. 422/245; 422/251; 422/254
[58] Field of Search ............ 422/245, 251, 252, 254; 62/542, 544, 545

[56] References Cited

U.S. PATENT DOCUMENTS

| 2,800,411 | 7/1957 | Church ............................. | 422/245 |
| 2,956,414 | 10/1960 | Steinbacher ..................... | 62/545 |
| 3,770,386 | 11/1973 | Hayashi et al. ................. | 62/542 |

FOREIGN PATENT DOCUMENTS

| 2133036 | 1/1972 | Fed. Rep. of Germany ...... | 422/251 |
| 3043823 | 6/1981 | Fed. Rep. of Germany ...... | 422/245 |
| 2064976 | 6/1981 | United Kingdom .............. | 422/252 |

Primary Examiner—S. Leon Bashore
Assistant Examiner—Michael K. Boyer
Attorney, Agent, or Firm—McDougall, Hersh & Scott

[57] ABSTRACT

Crystals containing a molten liquid at the bottom of a purifying tower are cooled, so that three effects i.e., washing, sweating and recrystallization are improved while maintaining a heat balance within a tower to thereby obtain highly pure crystals. The apparatus according to this invention comprises a crystal purifying tower of a transversal cross sectional configuration in which two circles are partially joined to each other and in which a stirrer having blade members spirally attached around the surface of a rotational shaft is disposed at the center for each of the circles, the purifying tower having a starting material feed means about at the middle thereof, a heating means and a product take out port at the upper portion thereof, a cooled crystal feed means, a low purity crystal component take out means and a means for extracting a portion of the crystal component at low purity out of the system at the bottom thereof, wherein the crystal component at low purity taken out by the low purity crystal component take out means is crystallized and then cooled by a means disposed outside the purifying tower for crystallizing and then cooling the crystal component at low purity, and the crystals thus crystallized and then cooled are fed by means of the cooled crystal feed means to the purifying tower.

4 Claims, 5 Drawing Figures

APPARATUS FOR PURIFYING CRYSTALS

BACKGROUND OF THE INVENTION

1. Field of the Invention

This invention relates to an apparatus for continuously purifying crystals by contacting crystalline substance containing impurities with a molten liquid resulted from the crystal component in a counter-current manner.

2. Description of the Prior Art

Various apparatus for purifying crystals have been known and used so far, including those adapted to purify crystals by utilizing a molten liquid resulted from a crystal component, for example, as disclosed in Japanese Patent Publication No. 40621/1972 (British Patent Specification No. 1225711). The apparatus disclosed in the patent publication is a vertical type purifying apparatus comprising means for feeding a substance to be purified including impurities into the lower portion of a tower, in which crystals are melted in the upper portion of the tower, the resulting molten liquid is caused to contact with the crystals upwards in the tower in a counter-current manner and the crystals purified through the contact are taken out from the upper portion of the tower. Two or more rotational shafts are disposed inside the purifying tower, and blade members are disposed spirally around the outer circumference of each of the rotational shafts, so that crystals fed from the lower feed port are transferred upwardly while being disintegrated. A heating portion is disposed, optionally, as means for preventing the deposition of the crystals onto the rotational portion or the wall surface of the tower itself. The apparatus is adapted to purify the crystal substance while rotating the rotary blades in the directions opposed to each other.

When crude crystals containing impurities are purified by using the liquid of the molten aimed crystal component in the crystal purifying apparatus of the foregoing structure, starting crude crystals are fed from the lower portion of the purifying tower and transferred upwardly toward the top of the tower by the rotary blades disposed inside. The crystals reaching the top of the tower are melted by a required amount into a liquid for recycle, which gravitationally moves downwardly in the inside of the tower. Thus, crystals reaching the top of the tower while being washed with the molten liquid are taken out from the top of the tower at a desired purity.

As the result of the analysis and study for the function in the crystal purification, the present inventors have discovered that the crystals are purified by the three types of effects taking place simultaneously, that is, the washing effect in which the surface of crystals rising upwards in the tower are washed through the continuous counter-current contact with the descending molten liquid at high purity, the sweating effect in which impurities contained in the crystals are removed when the crystals are heated and stagnated by the descending molten liquid and the recrystallizing effect in which the descending molten liquid is cooled to recrystallize due to the crystals rising upwards from the lower portion of the tower.

Although it has been found that the washing effect by the molten liquid is extremely remarkable, among the effects as described above, the purity obtained upon purification has a certain limit only with this washing effect. This is shown by the trend of the solid line in the graph of FIG. 1. FIG. 1 is a graph illustrating the relationship between the content of impurities in the crystals obtained by continuously washing crude crystals with a sufficient amount of pure liquid and the quantity of the washing liquid. As apparent from the graph, while the washing effect can be improved by the increase in the quantity of the washing liquid, it can be expected to attain no higher washing effect when the impurity content is decreased to a certain level. While on the other hand, crystals at a purity near the point a in FIG. 1 can be obtained when a certain amount of crude crystals in a eutectic system is heated to a temperature near the melting point and then washed with a pure liquid after maintaining for about one hour. This shows that the sweating effect acts very effectively. Further, in the experiment where crude crystals of a predetermined amount are placed and heated to a predetermined temperature on a metal gauge situated in a container and recrystallized while extracting a portion of a falling liquid, the purity of the thus obtained crystals is extremely high in the same level as above.

Thus, the present inventors have studied on the method of improving the washing, sweating and recrystallizing effects together. However, in the purifying apparatus as described in the Japanese Patent Publication No. 40621/1972, if the functions of these effects are intended to be improved, the purification yield (ratio of the product relative to starting material) is significantly reduced. This may be attributable to the fact that while the foregoing three effects can be improved by increasing the amount of heat in the upper portion of the purifying tower, the molten liquid falls in the tower and is discharged out of the system from the bottom to significantly reduce the yield since this prior apparatus has no cooling means for the crystals.

That is, although the effects of washing, sweating and recrystallization have also been utilized in the prior apparatus, the three effects can not be attained satisfactorily since it has been difficult to crystallize the molten crystal component at the bottom of the purification apparatus. If the molten liquid is cooled only slightly, crystals will be deposited on the cooling surface to hinder the heat exchange.

OBJECT AND SUMMARY OF THE INVENTION

Accordingly, it is an object of this invention to provide a crystal purifying apparatus which is capable of improving the foregoing three effects, that is, washing, sweating and recrystallization by converting crystals containing a mother liquid present at the bottom of a purifying tower (bottom crystals) into cooled granular crystals that are cooled by a required amount of heat calory into a crystal form suitable to the purifying apparatus, recyclically feeding the cooled crystals to the bottom of the tower to thereby cool the bottom, while keeping a heat balance within the tower, and thereby purifying the crystals at a desired high purity without reducing the purification yield.

The foregoing object can be attained by the purifying apparatus according to this invention, which comprises a crystal purifying tower of a transversal cross sectional configuration in which two circles are partially joined to each other and in which a stirrer having blade members spirally attached around the surface of its rotational shaft is disposed at the center of each of the circles, the purifying tower having a starting material feed means disposed about at the middle portion thereof, a heating means and a product take out port disposed at the upper portion thereof, and cooled crystal feed means, low purity crystal component take out means and means for extracting a portion of the crystal component at low purity out of the system disposed at the lower portion thereof, wherein the crystal component at low purity taken out by said low purity crystal component take out means is crystallized and then cooled by a means disposed outside of the purifying tower for crystallizing and then cooling the crystal component at low purity, and the thus crystallized and then cooled crystals are fed by means of the cooled crystal feed means to the purifying tower.

In accordance with the foregoing constitution, the crystal component at low purity taken out from the bottom of the purifying tower by the low purity crystal component take out means is crystallized and then cooled by a required amount of heat calory by the means disposed outside the purifying tower for crystallizing and then cooling the crystal component at low purity and, thereby, the cooled crystals now converted into the granular shape of about 1 mm average grain size suitable to the procession in the purifying apparatus can be returned to the purifying tower. Then, the heat balance in the purifying tower can be controlled intentionally by cooling the bottom of the purifying tower with the cooled granular crystals, and the amount of the molten liquid of the purified crystal component recycled to the inside of the tower can be controlled by increasing the amount of heat in the upper portion of the purifying tower by the heating means. Therefore, since the washing, sweating and recrystallizing effects can be improved together, crystals can be purified to an extremely high purity level, even in a case where the impurities present in the starting crude crystals is such a component as forming a solid solution system with the aimed purified component difficult to be purified, as well as in the case where the impurities form an eutectic system with the aimed purified component, whereby the purity as shown by a dash-dot line in FIG. 1 can be obtained upon purification.

One of the most important conditions in purifying the crystal component using the apparatus according to this invention is to avoid the solidification of the crystal component at low purity extracted from the bottom of the purifying tower when it is cooled to crystallize. If the crystal component at low purity taken out from the tower in the crystal form containing a mother liquid as well as in the liquid form is rapidly cooled, it is deposited to solidify on the cooling means and, further, forms a bulky mass not suitable to be recycled to the purifying tower.

In order to convert the crystal component at low purity taken out from the tower in a liquid form or a crystal form containing a mother liquid into the state of cooled crystals suitable to the recycling to the purifying tower, it is desirable to crystallize the crystal component at low purity in a liquid form and crystal form containing the mother liquid by mixing it with the cooled crystals and, thereafter, cooled to a desired temperature by a cooler.

In addition, the crystal purification according to this invention is advantageous in that the product can be processed with less thermal damage since the separation of the substance takes place at a melting point much lower than the boiling point of the substance. Furthermore, the crystal purification according to this invention has a merit in that waste steams or drains at a low pressure can be utilized as the high heat source and an inexpensive heat source such as sea water can be utilized as the low heat source in a case where the boiling point of the aimed crystal component is less than 100° C., for instance, as in the case of naphthalene upon purification.

DETAILED DESCRIPTION OF THE PREFERRED EMBODIMENTS

The apparatus according to this invention will now be described more specifically referring to the accompanying drawings.

Figure 2:
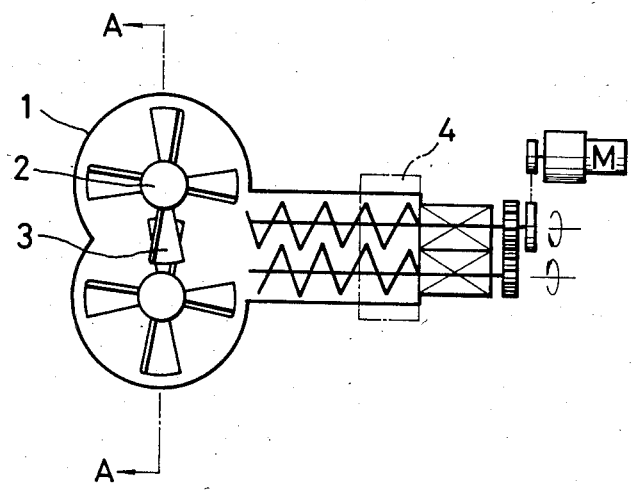
FIG. 2 is a schematic transversal cross sectional view for a purifying tower as a preferred embodiment according to this invention.
Figure 3:
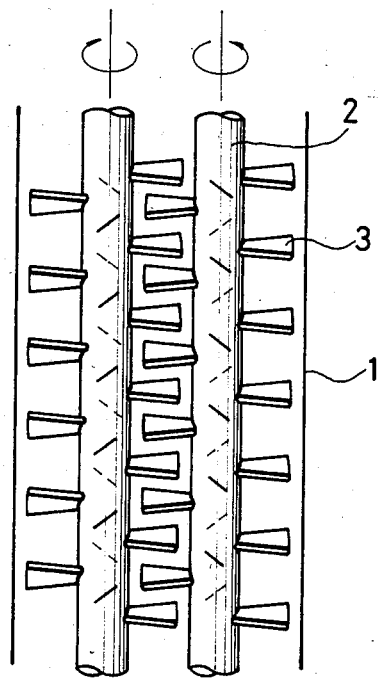
FIG. 3 is a cross sectional view taken along line A—A of the embodiment shown in FIG. 2, and FIG. 4 and FIG. 5 are, respectively, vertical cross sectional views for different embodiments of the apparatus according to this invention.

As shown in FIG. 2 and FIG. 3, a purifying tower 1 has a transversal cross sectional shape in which two circles are partially joined with each other, and in which two stirrers each having a rotational shaft 2 and blade member 3 arranged spirally at the surface thereof are disposed at the centers for the circles respectively.

The first embodiment of the apparatus according to this invention will be explained at first referring to FIG. 4. The purifying tower 1 has a starting material feed port 4 disposed about at the middle thereof, a heating means 5 in the upper portion of the tower, a purified crystal take out port 6 at the top of the tower, and a crystal take out port 7 and a solid-liquid separation plate 8 as a low purity crystal component take out means, and a cooled crystal feed means 9 at the bottom of the tower. The crystal component at low purity in a crystal form containing mother liquid taken out from the low purity crystal component take out means is sent by way of an elevating conveyor 10 to a means for crystallizing and then cooling the crystal component at low purity.

The means for crystallizing and then cooling the crystal component at low purity comprises a precooling tank (crystal mixing tank) 11, a cooler 12, and a crystal recycle conveyor 13, in which the crystal component at low purity in the crystallized form containing mother liquid sent from the elevating conveyor 10 is entered into the pre-cooling tank 11. Pre-cooled crystals are previously supplied to the precooling tank 11 and the crystal component at low purity is cooled to crystallize when it is admixed with the already cooled crystals. Then it is sent together with the already cooled crystals to the cooler 12, where they are cooled to a desired temperature and then returned from the cooled crystal feed means 9 to the purifying tower 1 in a balanced amount corresponding to the amount taken out from the purifying tower 1 as the crystal component at low purity. While on the other hand a portion of the cooled crystals from the cooler 12 is sent by way of the crystal recycle conveyor 13 to the pre-cooling tank 11 for use in the preliminary cooling of the crystal component at low purity taken out from the purifying tower 1. The liquid component separated by the solid-liquid separation plate 8 is discarded from the discharge port 17 out of the system.

The second embodiment of this invention will now be explained referring to FIG. 5. In this case, different from the embodiment in FIG. 4, the crystal component at low purity is taken out in a liquid form from the bottom of a purifying tower 1. That is, in FIG. 5, the crystal component at low purity in the liquid form issued from a solid-liquid separation plate 8 at the bottom of the tower is taken out from a take out port 14 and a portion thereof is discarded from a discharge port 17. While on the other hand, the remaining portion of the liquid is sent by a recycle pump 15 through a recycling pipeway 16 to a pre-cooling tank 11. In the same manner as in FIG. 4, the liquid is mixed with the pre-cooled crystals, crystallized and, then, returned to the purifying tower 1 after being cooled to a desired temperature in a cooler 12.

In the purification of crystals using the apparatus according to this invention, the upper portion of the purifying tower 1 is maintained substantially at a melting point for the aimed crystal component by the heating means 5. The starting crude crystals are fed through the starting material feed port 4 disposed at the middle of the purifying tower. When the rotary blades 3 disposed inside of the tower are rotated in the direction of uprising the crystals in the tower, the starting crystals move upwardly in the tower while being purified. The purity of the crystals is naturally lower in the portion nearer to the bottom of the tower. In the embodiment shown in FIG. 4, a portion of the crystals in the bottom is taken out at the position nearest to the solid-liquid separation plate 8, cooled to a predetermined temperature by the pre-cooling tank 11 and the cooler 12 and then fed again to the purifying tower 1. In this case, the extraction amount and the cooling temperature for the low purity crystals are determined depending on the heat calory applied at the upper portion in the tower for the purification at high level.

It is preferred in this embodiment that the blades of the stirrer disposed in the pre-cooling tank (crystal mixing tank) 11 have a rotational shaft in the shape of an elongate round rod so as to reduce the flow resistance upon mixing the crystals, as well as that the agitating blades are secured spirally around the rotational shaft so as to provide a function of transferring the crystals from the upper position to the exhaust port below while mixing them. Furthermore, it is desired that the top end of the rotational shaft is extended to a discharge pipe at the bottom of the crystal mixing tank 11, and the portion of the shaft extended into the discharge pipe is provided with a screw blade for providing an adequate crystal crushing function.

Further, it is preferred that the cooler 12 comprises a cooling screw in a structure capable of passing water through the inside so that the crystals fed from the pre-cooling tank (crystal mixing tank) 11 may be cooled to a desired temperature while being sent to the outlet of the cooler. Example Crude naphthalene containing 10% by weight of thianaphthene forming a solid solution system with naphthalene was purified by the apparatus as described below.

Figure 4:
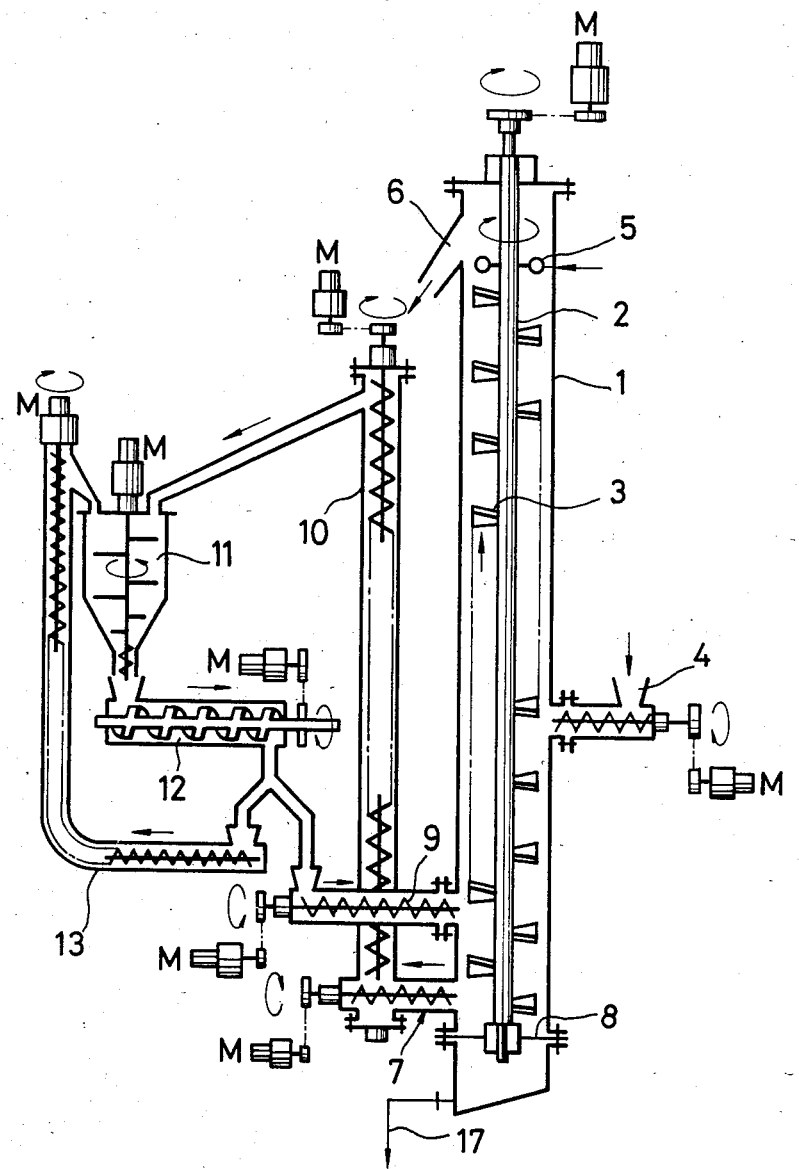
Figure 5:
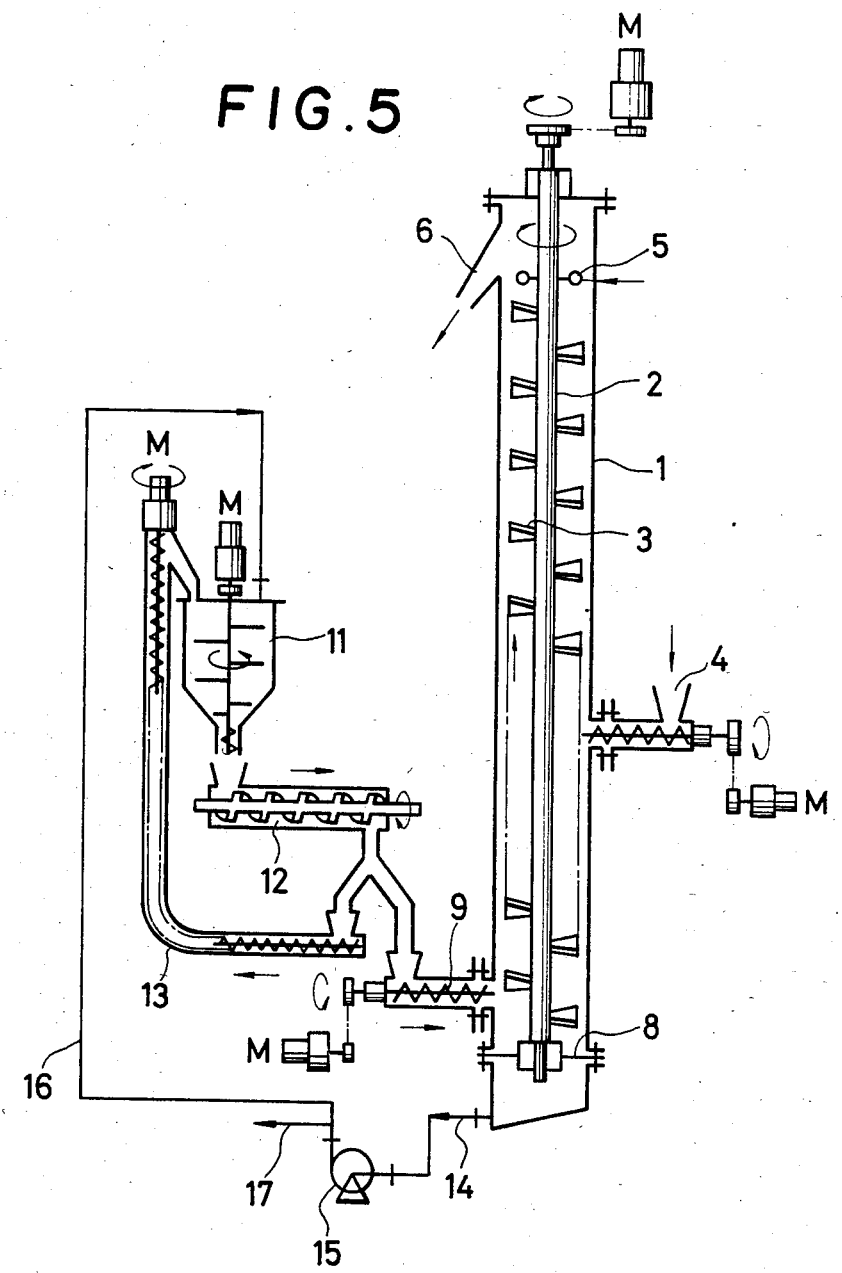

The apparatus employed in this Example is as shown in FIG. 4, that is, it comprises a purifying tower made of stainless steel of about 1 m height having a transversal sectional configuration, in which two circles each of 83 mm inner diameter are joined to each other at center-to-center distance of 54 mm, and having rotary blades as shown in FIG. 2 and FIG. 3, and a crystal mixing tank and a crystal cooler combined with the tower.

In the apparatus, crude naphthalene at 99% purity was fed from the starting material feed port at a rate of 5 kg/Hr and crude naphthalene at about 99.98% purity was obtained at a rate of 4.9 kg/Hr while maintaining the temperature in the upper portion of the tower at about 81° C. and cooling and recycling the crystals in the lower portion of the tower.

Figure 1:
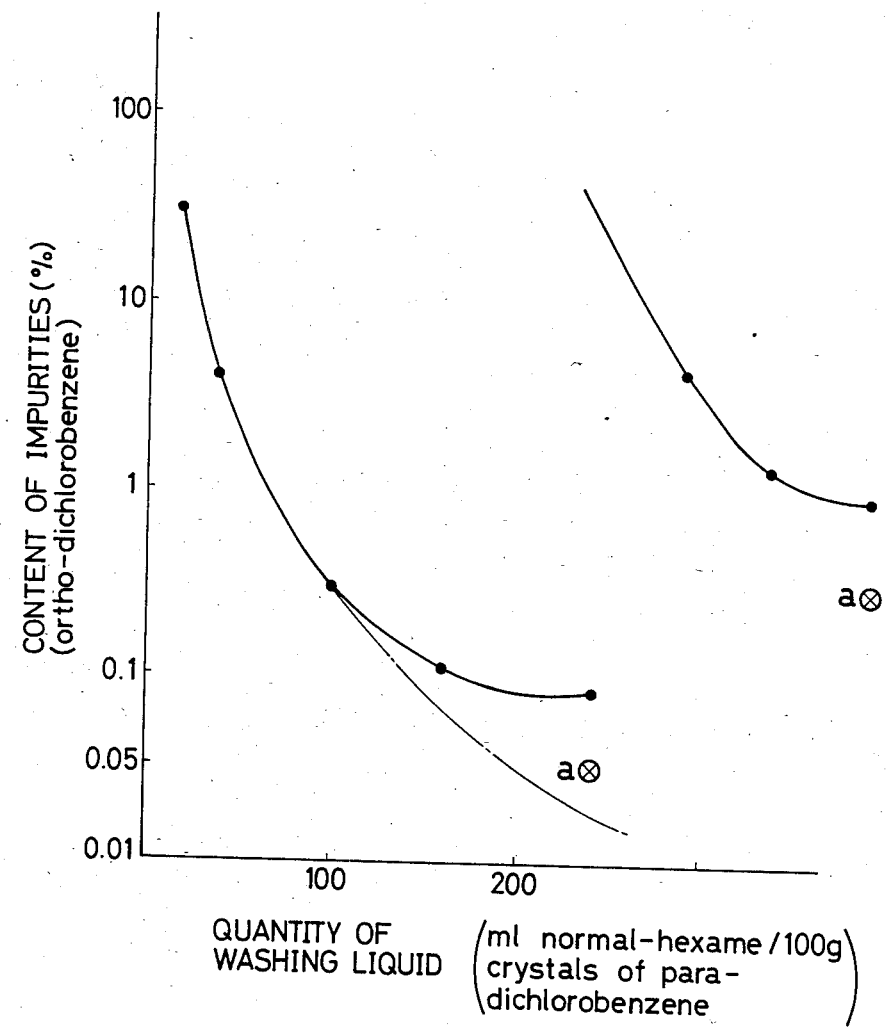
FIG. 1 is a graph illustrating the relationship between the quantity of washing liquid and the impurity content when crude crystals are washed.

From the above result, it is considered that the purity as shown by the dash-dot line in the graph of FIG. 1 can be obtained upon purification when using the apparatus according to this invention.

What is claimed is:

1. In a crystal purifying apparatus comprising a crystal purifying tower having a transverse cross-section, a rotational shaft disposed within the tower, blade members spirally attached to the exterior of the shaft to provide a stirrer, said purifying tower having a starting material feed means disposed about at the middle portion thereof, a heating means and means defining a a product take out port disposed at the upper portion thereof, a low purity crystal component take out means and a means for extracting a portion of the crystal component at low purity out of said tower disposed at the lower portion thereof, means for crystallizing the crystal component at low purity taken out by the low purity crystal component take out means, means for cooling the crystallized component, said crystallizing and cooling means disposed outside of said purifying tower, and means for feeding the crystallized and resultant cooled crystals to said purifying tower, the improvement in said means for crystallizing and means for cooling comprising a crystal mixing tank having an exhaust tube part at the bottom of the tank for mixing the crystal component at low purity taken out from said purifying tower with pre-cooled crystals to cool and crystallize the same, a cooler for continuously cooling said cooled and crystallized crystals from the mixing tank to a desired temperature, and a feed means for feeding a portion of the crystals cooled in the cooler back into said crystal mixing tank, and additional feed means for feeding the balance of said crystals cooled in the cooler to said purifying tower.

2. The crystal purifying apparatus as defined in claim 1, wherein said low purity crystal component take out means includes a solid-liquid separation plate disposed at the bottom of said crystal purifying tower to remove the liquid crystal component at low purity passing therethrough.

3. The crystal purifying apparatus as defined in claim 1, wherein the low purity crystal component take out means includes a solid-liquid separation plate disposed at the bottom of the crystal purifying tower to remove a solid crystal component at low purity from above the plate.

4. The crystal purifying apparatus as defined in claim 1, wherein the crystal mixing tank has blades each in the shape of a round rod disposed spirally around a rotatable shaft, and a stirrer having a screw blade is disposed inside the exhaust tube part at the bottom of the mixing tank.

* * * * *